Figure 1:
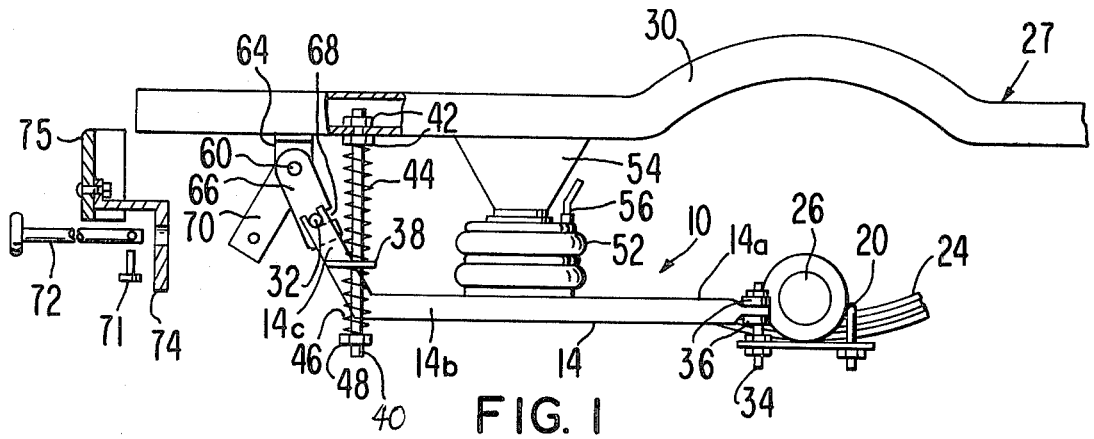

United States Patent [19]
Hixon

[11] 4,181,324
[45] Jan. 1, 1980

[54] OVERLOAD STABILIZER UNIT FOR VEHICLE

[76] Inventor: William K. Hixon, One Scott Ct., Scotts Valley, Calif. 95066

[21] Appl. No.: 839,878

[22] Filed: Oct. 6, 1977

[51] Int. Cl.² ............................................. B60G 11/62
[52] U.S. Cl. .................................................... 280/713
[58] Field of Search ................... 280/703, 713; 267/15

[56] References Cited

U.S. PATENT DOCUMENTS

| | | | |
|---|---|---|---|
| 2,859,046 | 11/1958 | Easton | 280/713 |
| 3,181,853 | 5/1965 | Howell | 280/713 |

Primary Examiner—Richard A. Bertsch
Attorney, Agent, or Firm—Townsend and Townsend

[57] ABSTRACT

A stabilizer unit having a pair of mounting rods adapted to extend fore and aft of a vehicle frame and to be pivoted at front ends thereof to locations near the outer ends of the rear axle of the vehicle. The rear ends of the mounting rods are adapted to be shiftably coupled by coil springs to respective bolts secured to and extending downwardly from respective frame members of the vehicle. A cross rod interconnects the rear ends of the mounting rods and acts as a sway bar. A pair of inflatable air springs or shock absorbers are disposed between respective frame members and the mounting rods, the air springs being between the front and rear ends of the mounting rods. When the stabilizer unit is to be put in use when a load is carried by the vehicle, the cross rod is secured against movement relative to the vehicle frame members by a pair of spaced, notched crank arms on a rotatable clamp rod carried by the vehicle, the notches of the crank arms receiving the cross rod as the clamp rod is rotated relative to the vehicle into an operative position. Inflation of the air springs then causes downward pressure on the mounting rods and thereby the rear axle to thereby cause a slight elevation of the rear end of the vehicle without any significant change in the elevation of the front end of the vehicle to thereby provide for uniform up and down movement of the frame when the wheels move over bumps in the roadway.

16 Claims, 2 Drawing Figures

OVERLOAD STABILIZER UNIT FOR VEHICLE

This invention relates to improvements in the stabilizing of a vehicle as it moves over a roadway and, more particularly, to an improved stabilizer unit which provides optimum control and smooth riding characteristics of the vehicle for variations in loads carried thereby.

BACKGROUND OF THE INVENTION

When some vehicles, such as pickup trucks, carry or pull relatively heavy loads, the ride is often quite rough and, as a result, the driver and passengers experience muscle fatigue and other body problems due to the lack of smoothness in the ride. Also, dangerous conditions can be created in which loss of control of the steering of such a vehicle can occur. The reason for this is that, when the load is placed near the rear of the vehicle, a major part of the load is carried by the rear wheel and it causes the front end to pivot upwardly, thereby tending to move the front wheels out of good traction contact with the road bed. This results in a decrease in the traction available for the front wheels of the vehicle, and the vehicle driver has less control of the front wheels for steering due to the decreased traction. Thus, if fishtailing or rear sway of the rear end of the vehicle occurs, especially while towing a trailer or the like, the vehicle driver often cannot regain control fast enough to avoid an accident.

Attempts have been made to minimize or eliminate these problems by providing stabilizers of various construction. For the most part, some of these attempts have been satisfactory but those that have typically are complex and are difficult to assemble and maintain. As a result, a need has arisen for an improved stabilizer unit which is simple and rugged in construction and which minimizes or substantially eliminates the problems mentioned above.

SUMMARY OF THE INVENTION

The present invention satisfies the aforesaid need by providing an improved stabilizer unit for attachment to a vehicle so that the driver and passengers will experience a much smoother ride in the vehicle than they would if the vehicle is equipped with conventional springs and shock absorbers. Also, the steering and other control of the vehicle will be maintained at all times as it carries or tows a relatively heavy load.

To this end, the stabilizer unit of the present invention comprises a pair of laterally spaced mounting members adapted to be located beneath the vehicle and to extend rearwardly from the rear axle of the vehicle. The front ends of the mounting rods are pivotally mounted to mounting plates adjacent to the rear axle so that the mounting rods can pivot up and down relative to the rear axle itself. A cross or torsion rod interconnects the rear ends of the mounting rods and provides a sway bar. The mounting rods are also connected by spring bias means to respective fore-and-aft frame members of the vehicle.

A pair of air springs between the mounting rods and the frame members pre-load the mounting rods and cause downward forces to be exerted on the rear axle when the cross rod at the rear of the mounting rods is rigidly coupled to the frame members. By inflating the air springs to specific pressures, the rear of the vehicle can be made to be elevated to a greater or lesser degree depending upon the load to be carried or towed by the vehicle; thus, the front end of the vehicle can be made to have the standard load to eliminate the possibility that traction will be decreased between the wheels of the front axle and the road bed.

Typically, the stabilizer unit of this invention is used near the rear axle of a vehicle whose front wheels are steerable. However, the stabilizer unit could be used with the front wheels of a vehicle if the rear wheels are steerable.

The primary object of this invention is to provide an improved stabilizer unit for a vehicle, wherein the stabilizer unit is simple and rugged in construction, can be readily coupled to an existing vehicle, provides smooth riding characteristics and good steering control, and can be made inexpensively and put into operation with a minimum of time and effort.

Another object of this invention is to provide a stabilizer unit of the type described, wherein the unit includes a pair of laterally spaced mounting rods pivotally mounted near the opposed ends of one axle of a vehicle and coupled by a pair of air springs or shock absorbers to the frame members of the vehicle so that greater or lesser amounts of pressure can be placed on the axle to raise the adjacent end of the vehicle to a greater or lesser extent depending upon the load applied to the vehicle so that sufficient traction will be maintained between the wheels of the other axle of the vehicle and the road bed.

Other objects of this invention will become apparent as the following specification progresses, reference being had to the accompanying drawings for an illustration of the invention.

IN THE DRAWINGS

Figure 2:
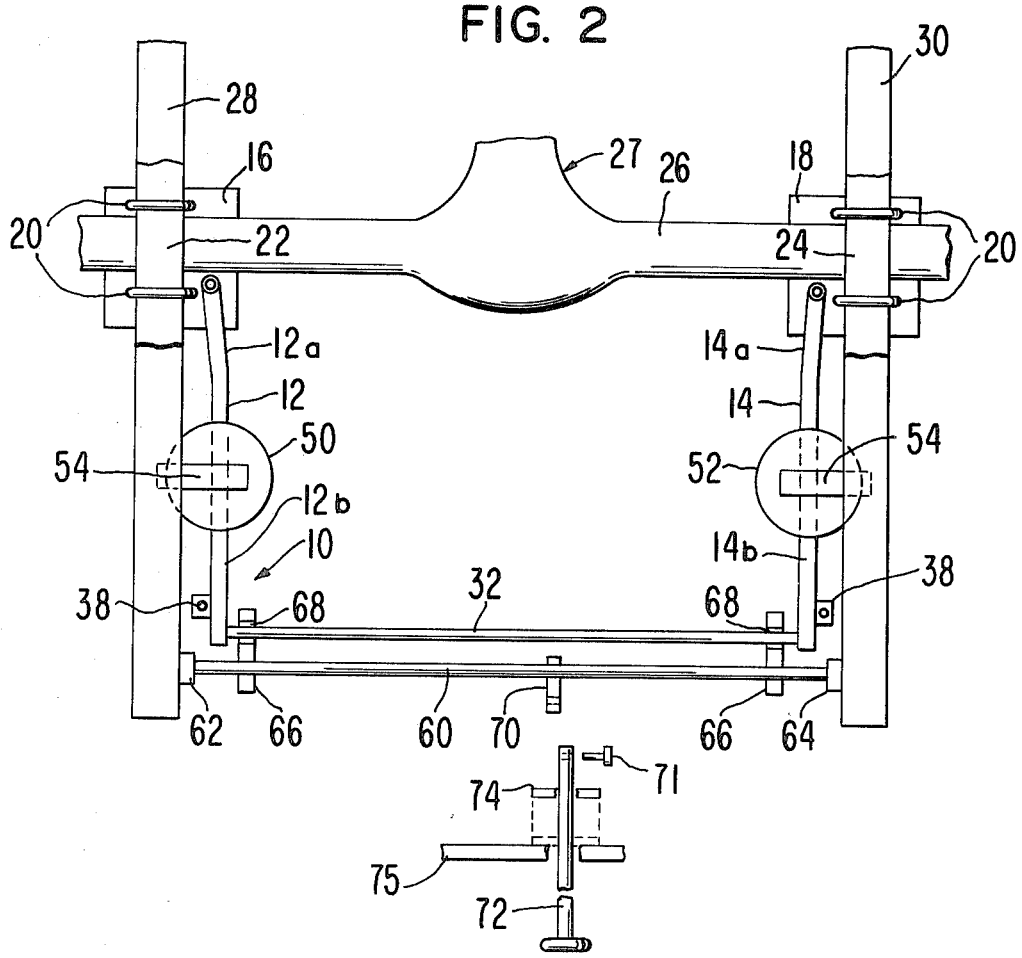

FIG. 1 is a side elevational view of the stabilizer unit of this invention, showing the same mounted on the rear of a vehicle; and FIG. 2 is a top plan view of the stabilizer unit, showing the way it is coupled to the frame and rear axle of the vehicle.

The stabilizer unit of this invention is broadly denoted by the numeral 10 and includes a pair of rigid mounting rods 12 and 14 which are adapted to be pivotally connected at their forward ends to respective mounting plates 16 and 18 secured by U-bolts 20 to respective conventional leaf springs 22 and 24 which underlie opposed ends of rear axle 26 of a vehicle 27, such as a pickup truck, as shown in FIG. 2. The mounting rods 12 and 14 are disposed below vehicle frame members 28 and 30 at respective sides of the vehicle above respective springs 22 and 24. Rod 12 has a forward portion 12a and a rear portion 12b, portions 12a and 12b being angularly disposed relative to each other to allow for mounting the rod without interfering with other structural elements of the vehicle. Similarly, rod 14 has a front portion 14a and a rear portion 14b, portions 12b and 14b being either generally parallel or slightly convergent as their rear ends are approached.

Portions 12b and 14b have inclined upwardly and rearwardly extending rear segments 12c and 14c. A clamp rod 32 extends between and is rigidly secured to the upper ends of the rear segments 12c and 14c so that clamp rod 32 is generally horizontal at all times. Rod 32 is, in effect, a torsion rod and gives a sway bar effect, i.e., it controls side-to-side tipping, especially when carrying tall loads, such as a tall cab over a camper truck.

The front ends of mounting rods 12 and 14 are pivotally coupled to respective plates 16 and 18 in any suitable manner, such as shown in FIG. 1. To this end, a bolt 34 extends through the corresponding plate, such as plate 18, and extends through a hole in the front end of the corresponding rod, such as rod 14. Rubber snubbers 36 on opposite sides of the front end of the rod permit slight pivotal up and down movement of the rod about a generally horizontal axis. Nuts at the upper and lower ends of bolt 34 hold the same in place in coupled relationship to the plate.

Each of mounting rods 12 and 14 has a lateral ear 38 thereon at rear segment 12c or 14c thereof. Each ear 38 shiftably receives a bolt 40, the upper end of the bolt being coupled by a pair of nuts 42 (FIG. 1) to the adjacent frame member, such as a frame member 28 in the case of rod 12 and frame member 30 in the case of rod 14. A first coil spring 44 surrounds bolt 40 between nuts 42 and the corresponding ear 38. A second coil spring 46 also surrounds bolt 40 and extends downwardly from ear 38 to a lower nut 48 threaded on the lower end of bolt 40. Both springs 44 and 46 are under compression. The bolts 40 will typically be slightly inclined to accommodate a small lateral spacing between ears 38 and the adjacent frame member; however, it is possible that rods 12 and 14 can ordinarily underlie frame members 28 and 30 so that the inclination of bolts 40 is minimized. Bolts 40, nuts 42 and springs 44 and 46 are not shown in FIG. 2 to simplify the drawing.

Rods 12 and 14 are provided with inflatable air springs or shock absorbers 50 and 52, respectively. These air springs are secured at their lower ends directly to the corresponding rods in any suitable manner and at their upper ends by brackets 54 to the corresponding frame members. These brackets 54 may be slightly inclined as they extend to the corresponding frame members. Each of the air springs has an air inlet 56 (FIG. 1) with a three-way valve by which it is inflated and deflated and the air inlets of the two air springs can be connected together if desired to permit air to equalize the air pressure in both air springs to aid traction when in use. When not in use, the air springs are vented to the atmosphere.

A control rod 60 is to be used to couple the rear end of unit 10 to the vehicle. Rod 60 is pivotally mounted by bearings or rubber brushings 62 and 64 at its ends to the rear ends of frame members 28 and 30. Bearings 62 and 64 allow for some slight axial movements of rod 60 when rear axle 26 moves up and down. In the alternative, rod 60 can be coupled to any other part of the vehicle so that it is axially rotatable.

Rod 60 has a pair of clamps 66 secured thereto near the ends thereof, each clamp having a notch 68 near its outer end of receiving clamp rod 32 in the manner shown in FIG. 1. A crank arm 70 near the center of rod 60 is adapted to be coupled by a pin 71 to the front end of a push arm 72 which can be mounted on a bracket 74 carried on the bumper 75 or other structure at the rear of the vehicle so that, by pushing forwardly on the rod, crank arm 70 is caused to rotate rod 60 in a counterclockwise sense when viewing FIG. 1 to move clamps 66 forwardly so that rod 32 is received within notches 68. Then, rod 32 is supported by rod 60 and thereby by the rear end of the vehicle. Thereafter, push arm 72 can be disengaged from crank arm 70 and removed from bracket 74 or it can remain coupled to crank arm 70, if desired.

In operation, stabilizer unit 10 is normally in a standby, inoperative position with air springs 50 and 52 deflated and with clamps 66 out of coupled relationship to rod 32. In such a case, clamps 66 will be rotated out of their operative position shown in FIG. 1 and will extend downwardly or downwardly and slightly rearwardly of the operative positions of FIG. 1. However, the rear end of stabilizer unit 10 will be supported by bolts 40, and the pre-adjustment of the compression of springs 44 and 46 will determine the inoperative locations of ears 38.

When it is desired to put the stabilizer unit into operation, push arm 72 is, unless already done so, engaged with bracket 74 and is coupled at its front end by pin 71 to the lower end of crank arm 70. Then the push rod is moved forwardly to cause rotation of rod 60 to pivot crank arms 66 in a counterclockwise sense when viewing FIG. 1, thereby causing notches 68 to move into partial embracing relationship to rod 32, thereby coupling crank arms 66 to rod 32 to support the latter. Then, air springs 50 and 52 are inflated to a given pressure, such as 12 psi, causing a downward force to be exerted on each of mounting rods 12 and 14. Then, the stabilizer unit is ready for use and the vehicle can be moved forwardly or rearwardly.

Pressure in air springs 50 and 52 tends to force the mounting rods 12 and 14 away from respective vehicle frame members 28 and 30. The resulting forces exert downward pressure on axle 26 of the vehicle, which results in raising of the frame away from the axle. Downward pressure on rear axle 26 and thereby bolts 40, which can pivot slightly relative to respective frame members, tends to lower the rear end of the vehicle and thereby to raise the front end of the vehicle. The amount of force exerted to raise the front of the vehicle is proportional to the ratio AB/BC, where AB is the distance from the rear axle to the corresponding air spring on each mounting rod, and BC is the distance from the air spring to the corresponding rear bolt 40. Locations A, B and C are shown in FIG. 1. Distance AB is typically 13 inches, and distance BC is typically 10 inches. This ratio is adjusted for optimum performance depending upon the type of vehicle with which stabilizer unit 10 is used.

In a typical example for a pickup truck having a gross weight of 2500 lbs., the stabilizer unit 10 was put into operation and the vehicle was weighed without a load. The front wheel weight was found to be about 1400 lbs., thereby causing the weight on the rear wheels to be about 1030 lbs. A load of about 750 lbs. was added to the vehicle after clamps 66 were moved into their operative positions of FIG. 1. The center of gravity of the load was near the rear axle. Then, the air springs were inflated to a pressure of 12 psi. This resulted in the rear bumper being raised by 1 inch. The front bumper height did not change. Thus, with the 750 lbs. load, the front axle weight was 1470 lbs., an increase of 70 lbs., thereby causing the rear axle weight to be about 1780 lbs., and maintaining the proper traction on the front wheels notwithstanding the location of the center of gravity of the load.

Typical air springs suitable for use with stabilizer 10 are of the type known as Ride-Rite heavy-duty air springs for motor homes, mini coaches, chassis mounts and certain 1 ton and 1½ ton commercial trucks, Stock number 1491A, Manufacturer's number SA-300, made by Firestone Tire and Rubber Company, Akron, Ohio.

I claim:

1. A stabilizer unit for a vehicle having an axle and a pair of spaced, fore and aft frame members comprising: a pair of mounting rods; means coupled with each mounting rod, respectively, for pivotally connecting one end of the rod to the vehicle near a respective end of the axle with the rod extending away from the axle; a cross rod connecting the opposite ends of the mounting rods together; inflatable means carried by each mounting rod, respectively, and adapted to engage a respective frame member for applying a downward force on the corresponding mounting rod and thereby the axle when said one end of the rod is connected to the vehicle; and means extending downwardly from a frame member and engageable with the cross rod for releasably securing the latter to the frame members at a location spaced from said axle to substantially prevent relative movement between the cross bar and the vehicle as the inflatable means of each mounting rod applies said downward force.

2. A stabilizer unit as set forth in claim 1, wherein said inflatable means comprises an air spring extending upwardly from the respective mounting rod at a location intermediate the ends thereof.

3. A stabilizer unit as set forth in claim 2, wherein each air spring has a bracket thereon for connecting the same to the corresponding vehicle frame member, and means connected to the rear end of each mounting rod, respectively, for shiftably mounting the same on the respective vehicle frame member.

4. A stabilizer unit as set forth in claim 1, wherein said connecting means for the one end of each rod comprises snubber structure permitting at least limited pivotal movement of the corresponding mounting rod about a generally horizontal axis relative to the axle when the mounting rod is connected thereto.

5. In a vehicle having an axle and a pair of spaced fore and aft frame members, the combination with said axle and said frame members of: a pair of mounting rods; means coupled with each mounting rod, respectively, for pivotally connecting one end of the rod to the vehicle near a respective end of the axle with the rod extending away from the axle; a cross rod connecting the opposite ends of the mounting rods together; inflatable means carried by each mounting rod, respectively, and connected to a respective frame member for applying a downward force on the corresponding mounting rod and thereby the axle; and means extending downwardly from a frame member and engageable with the cross rod for releasably securing the latter to the frame members at a location spaced from said axle to substantially prevent relative movement between the cross bar and the vehicle as the inflatable means of each mounting rod applies said downward force.

6. A stabilizer unit as set forth in claim 5, wherein said inflatable means comprises an air spring extending upwardly from the respective mounting rods at a location intermediate the ends thereof.

7. A stabilizer unit as set forth in claim 6, wherein each air spring has a bracket connecting the same to the corresponding vehicle frame member, and means connected to the rear end of each mounting rod, respectively, for shiftably mounting the same on the respective vehicle frame member.

8. A stabilizer unit as set forth in claim 5, wherein said connecting means for the one end of each rod comprises snubber structure permitting at least limited pivotal movement of the corresponding mounting rod abut a generally horizontal axis relative to the axle.

9. A stabilizer unit for a vehicle having an axle and a pair of spaced, fore and aft frame members comprising: a pair of mounting rods; means coupled with each mounting rod, respectively, for pivotally connecting one end of the rod to the vehicle near a respective end of the axle with the rod extending away from the axle; a cross rod connecting the opposite ends of the mounting rods together; an air spring carried by and extending upwardly from each mounting rod, respectively, intermediate the ends thereof and having a bracket thereon for connecting the same to a respective frame member for applying a downward force on the corresponding mounting rod and thereby the axle when said one end of the rod is connected to the vehicle; a bolt connected to the rear end of each mounting rod, respectively, for shiftably mounting the same on the respective frame member, each bolt adapted to extend downwardly from the respective frame member, each mounting rod having a lateral ear shiftably mounted on the bolt, there being a first spring between the ear and the upper end of the bolt and a second spring between the ear and the lower end of the bolt, the springs being operable to bias the ear and thereby the corresponding mounting rod in respective directions along the rod; and means engageable with the cross rod for releasably securing the latter to the frame members at a location spaced from said axle to substantially prevent relative movement between the cross bar and the vehicle as the inflatable means of each mounting rod applies said downward force.

10. A stabilizer unit for a vehicle having an axle and a pair of spaced, fore and aft frame members comprising: a pair of mounting rods; means coupled with each mounting rod, respectively, for pivotally connecting one end of the rod to the vehicle near a respective end of the axle with the rod extending away from the axle; a cross rod connecting the opposite ends of the mounting rods together; inflatable means carried by each mounting rod, respectively, and adapted to engage a respective frame member for applying a downward force on the corresponding mounting rod and thereby the axle when said one end of the rod is connected to the vehicle; a clamp rod having means at the end thereof for rotatably mounting the same on the vehicle; and means carried by the clamp rod for engaging and supporting the cross rod after the clamp rod has been rotated relative to the vehicle through a predetermined arc, whereby the cross rod is secured to the frame members at a location spaced from said axle to substantially prevent relative movement between the cross bar and the vehicle as the inflatable means of each mounting rod applies said downward force.

11. A stabilizer unit as set forth in claim 10, wherein the clamp rod has bearing structure at the ends thereof for mounting the rod for rotation about a generally horizontal axis, and means engageable with the clamp rod for rotating the same when the latter is mounted on the vehicle.

12. A stabilizer unit as set forth in claim 11, wherein said supporting means comprises a pair of clamp arms secured to and extending laterally from the clamp rod, each clamp rod having a notch for receiving the cross rod as the clamp rod is rotated into an operative location.

13. In a vehicle having an axle and a pair of spaced fore and aft frame members, the combination with said axle and said frame members of: a pair of mounting rods; means coupled with each mounting rod, respectively, for pivotally connecting one end of the rod to the vehicle near a respective end of the axle with the rod extending away from the axle; a cross rod connecting the opposite ends of the mounting rods together; an air spring carried by and extending upwardly from each mounting rod, respectively, intermediate the ends thereof and having a bracket thereon for connecting the same to a respective frame member for applying a downward force on the corresponding mounting rod and thereby the axle; a bolt connected to the rear end of each mounting rod, respectively, for shiftably mounting the same on the respective frame member, each bolt adapted to extend downwardly from the respective frame member, each mounting rod having a lateral ear shiftably mounted on the bolt, there being a first spring between the ear and the vehicle frame member and a second spring between the ear and the lower end of the bolt, the springs being operable to bias the ear and thereby the corresponding mounting rod in respective directions along the rod; and means engageable with the cross rod for releasably securing the latter to the frame members at a location spaced from said axle to substantially prevent relative movement between the cross bar and the vehicle as the inflatable means of each mounting rod applies said downward force.

14. In a vehicle having an axle and a pair of spaced fore and aft frame members, the combination with said axle and said frame members of: a pair of mounting rods; means coupled with each mounting rod, respectively, for pivotally connecting one end of the rod to the vehicle near a respective end of the axle with the rod extending away from the axle; a cross rod connecting the opposite ends of the mounting rods together; inflatable means carried by each mounting rod, respectively, and connected to a respective frame member for applying a downward force on the corresponding mounting rod and thereby the axle; a clamp rod having means at the end thereof for rotatably mounting the same on the vehicle; and means carried by the clamp rod for engaging and supporting the cross rod after the clamp rod has been rotated relative to the vehicle through a predetermined arc, whereby the cross rod is releasably secured to the frame members at a location spaced from said axle to substantially prevent relative movement between the cross bar and the vehicle as the inflatable means of each mounting rod applies said downward force.

15. A stabilizer unit as set forth in claim 14, wherein the mounting means for the clamp rod includes a bearing at each end thereof, the bearings being secured to respective frame members and being operable to permit rotation of the clamp rod about a generally horizontal axis and to permit limited axial movement of the clamp rod, and means engageable with the clamp rod for rotating the same relative to the vehicle.

16. A stabilizer unit as set forth in claim 15, wherein said supporting means comprises a pair of clamp arms secured to and extending laterally from the clamp rod, each clamp rod having a notch for receiving the cross rod as the clamp rod is rotated into an operative location.

* * * * *